US010884791B2

(12) United States Patent
Helak et al.

(10) Patent No.: US 10,884,791 B2
(45) Date of Patent: *Jan. 5, 2021

(54) MIGRATING JOBS FROM A SOURCE SERVER FROM WHICH DATA IS MIGRATED TO A TARGET SERVER TO WHICH THE DATA IS MIGRATED (71) Applicant: International Business Machines Corporation, Armonk, NY (US)

(72) Inventors: Dustin A. Helak, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,550

(22) Filed: Feb. 14, 2019

(65) Prior Publication Data
US 2019/0179666 A1 Jun. 13, 2019

Related U.S. Application Data (63) Continuation of application No. 13/970,559, filed on Aug. 19, 2013, now Pat. No. 10,275,276.

(51) Int. Cl.
*G06F 9/48* (2006.01)
(52) U.S. Cl.
CPC .................. *G06F 9/4856* (2013.01)

(58) Field of Classification Search
None
See application file for complete search history.

(56) References Cited

U.S. PATENT DOCUMENTS

| 8,296,759 | B1 | 10/2012 | Hutchins et al. |
| 8,966,382 | B1 | 2/2015 | Yehuda et al. |
| 9,710,187 | B1 | 7/2017 | Si et al. |
| 2006/0047713 | A1 | 3/2006 | Gornshtein et al. |
| 2007/0094466 | A1 | 4/2007 | Sharma et al. |
| 2007/0260830 | A1 | 11/2007 | Faibish et al. |

(Continued)

OTHER PUBLICATIONS

Koller, R., "I/O Deduplication: Utilizing Content Similarity to Improve I/O Performance", Sep. 2010, ACM Transactions on Storage, vol. 6, No. 3, Article 13, Florida International University.

(Continued)

*Primary Examiner* — Wynuel S Aquino
(74) *Attorney, Agent, or Firm* — Konrad Raynes Davda & Victor LLP; David W. Victor (57) ABSTRACT

Provided are a computer program product, system, and method for migrating jobs from a source server from which data is migrated to a target server to which the data is migrated. Mirrored data is copied from a source storage to a target storage. A determination is made of at least one eligible job of the jobs executing in the source server having execution characteristics indicating that the job is eligible for migration to the target server. The determined at least one eligible job is migrated to the target server to execute on the target server and perform operations with respect to the mirrored data in the target storage. The migrated eligible job is disabled at the source server.

20 Claims, 7 Drawing Sheets

(56) References Cited

U.S. PATENT DOCUMENTS

| | | | | |
|---|---|---|---|---|
| 2008/0162779 A1* | 7/2008 | Morris | ............... | G06F 3/061 |
| | | | | 711/100 |
| 2008/0163219 A1 | 7/2008 | Marwinski | | |
| 2009/0064151 A1 | 3/2009 | Agarwal et al. | | |
| 2009/0165014 A1 | 6/2009 | Park | | |
| 2009/0300641 A1 | 12/2009 | Friedman et al. | | |
| 2011/0093862 A1* | 4/2011 | Doatmas | ............... | G06F 3/0617 |
| | | | | 718/105 |
| 2011/0153824 A1 | 6/2011 | Chikando et al. | | |
| 2011/0231698 A1 | 9/2011 | Zlati et al. | | |
| 2012/0054771 A1 | 3/2012 | Krishnamurthy et al. | | |
| 2012/0089797 A1 | 4/2012 | Shibayama et al. | | |
| 2013/0174176 A1 | 7/2013 | Kopylovitz | | |
| 2013/0297871 A1 | 11/2013 | Reddy | | |
| 2013/0332558 A1* | 12/2013 | Condict | ............... | G06F 3/0641 |
| | | | | 709/214 |
| 2014/0082308 A1* | 3/2014 | Naruse | ............... | G06F 3/0653 |
| | | | | 711/158 |
| 2015/0052531 A1 | 2/2015 | Helak et al. | | |
| 2015/0370501 A1* | 12/2015 | Aikoh | ............... | G06F 3/061 |
| | | | | 711/114 |
| 2016/0085585 A1 | 3/2016 | Chen et al. | | |

OTHER PUBLICATIONS

F. Kyne, et al., "GDPS Family an Introduction to Concepts and Capabilities", IBM Corp., IBM Document No. SG24-6374_08, Mar. 2013, pp. 302.

Office Action 1 for U.S. Appl. No. 13/970,559, 31 pp., dated Aug. 7, 2015. [18501 (OA1)].
Response to Office Action 1 for U.S. Appl. No. 13/970,559, 14 pp., dated Nov. 10, 2015. [18.501 (ROA1)].
Final Office Action 1 for U.S. Appl. No. 13/970,559, 22 pp., dated Feb. 4, 2016. [18.501 (FOA1)].
Response to Final Office Action 1 for U.S. Appl. No. 13/970,559, 14 pp., dated May 4, 2016. [18.501 (RFOA1)].
Office Action 3 for U.S. Appl. No. 13/970,559, 22 pp., dated Aug. 11, 2016. [18.501 (OA3)].
Response to Office Action 3 for U.S. Appl. No. 13/970,559, 13 pp., dated Nov. 14, 2016. [18.501 (ROA3)].
Final Office Action 2 for U.S. Appl. No. 13/970,559, 24 pp., dated Mar. 23, 2017. [18.501 (FOA2)].
Response to Final Office Action 2 for U.S. Appl. No. 13/970,559, 15 pp., dated May 23, 2017. [18.501 (RFOA2-1)].
Advisory Action for U.S. Appl. No. 13/970,559, 4 pp., dated Jun. 16, 2017. [18.501 (AdvAct)].
Response to Final Office Action 2 for U.S. Appl. No. 13/970,559, 18 pp., dated Jun. 23, 2017. [18.501 (RFOA2-2)].
Office Action 5 for U.S. Appl. No. 13/970,559, 19 pp., dated Apr. 23, 2018. [18.501 (OA5)].
Response to Office Action 5 for U.S. Appl. No. 13/970,559, 18 pp., dated Jul. 23, 2018. [18.501 (ROA5)].
Notice of Allowance 1 for U.S. Appl. No. 13/970,559, 11 pp., dated Dec. 18, 2018. [18.501 (NOA1)].
List of IBM Patents or Patent Applications Treated as Related, Feb. 15, 2019, 2 pp. [18.501C1 (Appendix P)].

* cited by examiner

FIG. 1

Job Performance Info Entry

FIG. 2

Point-in-Time Copy Info Entry

FIG. 3

Job Migration Information Entry

FIG. 4

Job Migration Request

MIGRATING JOBS FROM A SOURCE SERVER FROM WHICH DATA IS MIGRATED TO A TARGET SERVER TO WHICH THE DATA IS MIGRATED

BACKGROUND OF THE INVENTION

1. Field of the Invention

The present invention relates to a computer program product, system, and method for migrating jobs from a source server from which data is migrated to a target server to which the data is migrated.

2. Description of the Related Art

In a storage environment, production volumes at a primary storage site may be copied to volumes in a secondary storage site to provide redundant copies of the data. The target data at the secondary site, to which the source data at the primary storage site is copied, may be copied to a third copy at the secondary site using point-in-time ("PiT") copy techniques, such as the International Business Machine Corporation's ("IBM®") FlashCopy® product. (FlashCopy and IBM are registered trademarks of IBM in the United States and other countries).

To create a flash copy of the data, while data is being mirrored to a remote site, a FREEZE command may be issued to freeze the migration of data from the source to the target so that the PiT FlashCopy may be taken on the migrated data, which is then consistent as of a point-in-time, and then a GO command issued to restart the mirroring after the FlashCopy completes, almost instantaneously. A Zero-Suspend FlashCopy operation takes a PiT FlashCopy at the remote site without freezing the mirror copying of the data. These PiT copies are generally used for backup purposes.

SUMMARY

Provided are a computer program product, system, and method for migrating jobs from a source server from which data is migrated to a target server to which the data is migrated. Mirrored data is copied from a source storage to a target storage. A determination is made of at least one eligible job of the jobs executing in the source server having execution characteristics indicating that the job is eligible for migration to the target server. The determined at least one eligible job is migrated to the target server to execute on the target server and perform operations with respect to the mirrored data in the target storage. The migrated eligible job is disabled at the source server.

DETAILED DESCRIPTION

Described embodiments provide techniques for determining jobs executing in a source server to migrate to a target server for execution while data is being mirrored from a source storage to a target storage. A job migration database maintains information on execution characteristics of the jobs executing at the source server. A determination is made of jobs eligible for migration based on the execution characteristics for the job indicated in the job migration database for jobs performing operations with respect to the mirrored data. In this way, described embodiments take advantage of a mirror copy of data on a target server and the computational resources on the target server by migrating production site source jobs to execute against the mirrored data on the target storage of the target server.

Figure 1:
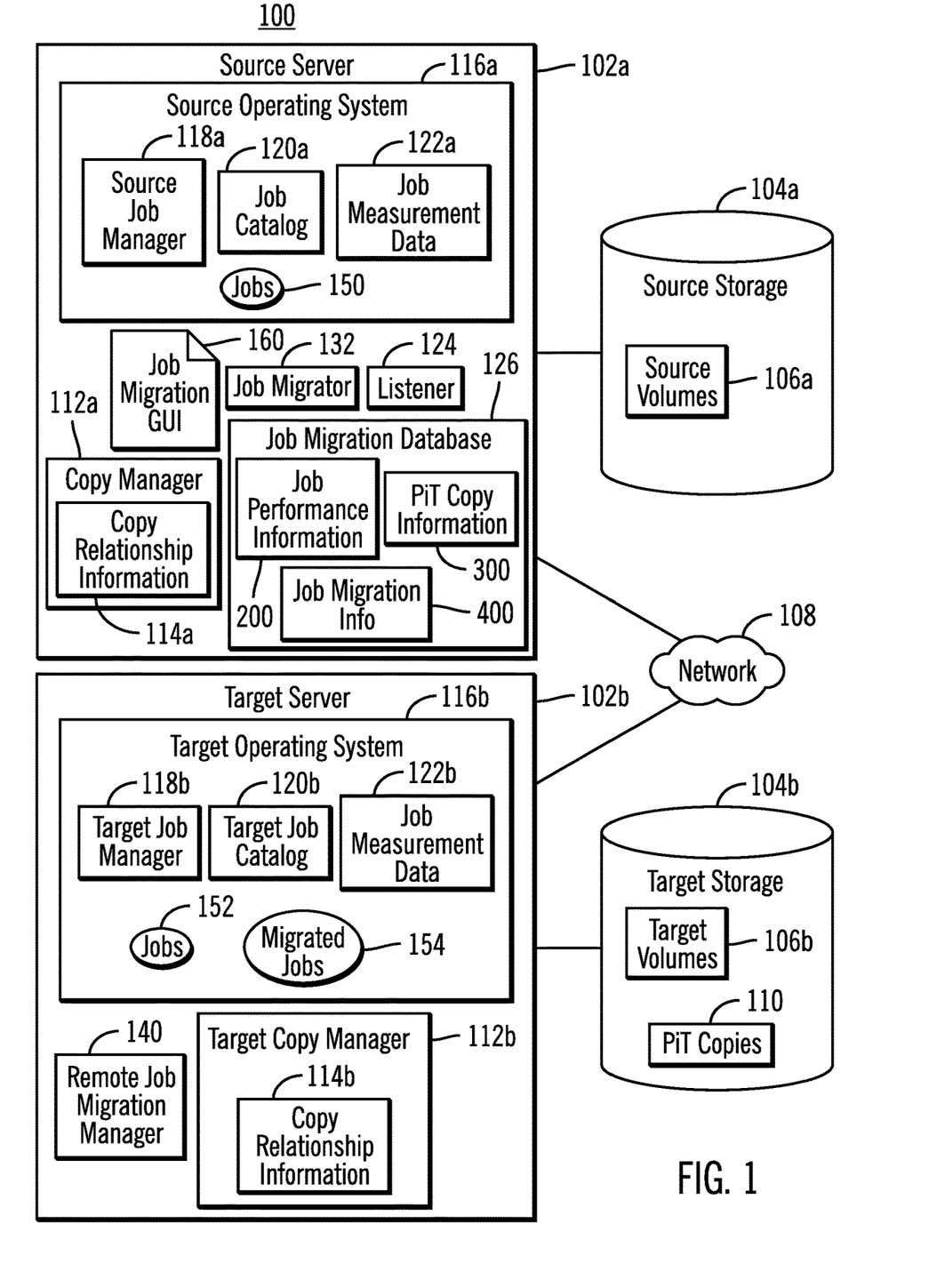
FIG. 1 illustrates an embodiment a storage computing environment.

FIG. 1 illustrates an embodiment of a data replication environment 100 having a source server 102*a* and source storage 104*a*, a target server 102*b* and target storage 104*b*, where data in source volumes 106*a* maintained in the source storage 104*a* may be mirrored to target volumes 106*b* in the target storage 104*b* through the source 102*a* and target servers 102*b* over a network 108. Mirrored data in the source volumes 106*a* subject to a mirror relationship may be continually copied to the target volumes 106*b* to provide a backup copy for disaster recovery purposes. Not all the data in the volumes 106*a* or all the volumes 106*a* may be subject to the mirror copy relationship. The target storage 104*b* may further contain point-in-time (PiT) copies 110 of the mirrored target volumes 106*b* at different points-in-time. The PiT copies 110 may be created using a point-in-time copy operation, e.g., FlashCopy, snapshot, etc., to create copies that are consistent as of a point-time.

The source server 102*a* includes a copy manager 112*a* to manage copy operations with respect to the to the target server 102*b*, including mirror copy operations from mirrored data in the source volumes 106*a* to the target volumes 106*b* and to initiate PiT copy operations. For instance, to create the PiT 110 copy, the copy manager 112*a* in the source server 102*a* may issue a FREEZE operation to stop the mirroring of data from the source storage 104*a* to the target storage 104*b* to make the mirrored data consistent as of a point-in-time at the source storage 4*a*, and then create a PiT copy 110 of the mirrored data at the target storage 104*b* while the data is consistent as of a point-in-time. After completing the PiT copy 110, which happens almost instantaneously, the source copy manager 112*a* may issue a GO command to thaw or unfreeze the mirror copy updates of mirrored data from the source storage 104*a* to the target storage 104*b*. In certain implementations, the copy manager 112 may issue a Zero Suspend FlashCopy operation to cause PiT copies to be created of target volumes 6*b* on the target storage 4*b* without freezing the mirroring of data from the source 104*a* to target 104*b*.

The target server 102*b* may further include a target copy manager 112*b* to manage PiT copies. The copy manager 112*a* and 112*b* include copy relationship information 114*a* and 114*b*, respectively, having information on consistency groups, mirror copy relationships, and defined mirror and point-in-time copies.

The source sever 102*a* includes a source operating system 116*a* having a source job manager 118*a* to manage one or more source jobs 150 that are executing in the source operating system 116*a*; a job catalog 120*a* having information on the jobs 150 executing in the source server 2*a*; and job measurement data 122*a* gathered by the operating system 102*a*. In operating systems, such as the IBM Z/OS® operating system. (Z/OS is a trademark of IBM in the United States and other countries), the job measurement data 122*a* may comprise System Management Facility (SMF) and Resource Measurement Facility (RMF) records. SMF records provide instrumentation of all baseline activities running in the operating system 12*a*, including, for the jobs 150 I/O, network activity, software usage, error conditions, processor utilization, etc. RMF records provide performance and usage instrumentation of resources used for the jobs 150 such as processor, memory, disk, cache, workload, virtual storage.

The target server 102*b* includes a target operating system 116*b* having a target job manager 118*b*, target job catalog 120*b*, and job measurement data 122*b* similar in function to those components on the source sever 2*a* to manage execution of target jobs 152 and any migrated jobs 154 comprising jobs 150 to be executed on the source server 102*a* that are migrated to execute on the target server 102*b*. The migrated jobs 154 may be managed by the target job manager 118*b* in the target job catalog 120*b*. The job measurement data 122*b* includes information on the execution of jobs 152 and 154.

The jobs 150, 152, and 154 may comprise any unit of execution, such as tasks or a job comprising a series of tasks and operations executed to carry out a larger function, such as batch processing operations, copy operations, PiT copy operations, analysis of data to produce a report, etc. When migrated jobs 154 execute on the target server 102*b*, and generate output, including new data sets to add to the mirrored data or modifications of existing data, the new and modified data generated from the migrated jobs 154 executing at the target server 102*b* may be transferred back to the source server 102*b* to apply to the source volumes 106*a*. For instance, if the job 154 reads mirrored data at the target storage 104*b* to perform data analysis and generates reports describing the analysis, these reports may be transferred back to the source server 102*a* to maintain in the source storage 104*a*. Any data updated by the migrated job 154 may be transferred back to the source server 102*a* to write to the source storage 104*a*.

The source server 102*a* further includes components to manage the migration of jobs 150 from the source server 102*a* to execute as jobs 154 on the target server 102*b* to take advantage of available of likely excess computational resource capacity on the target server 102*b*. A listener 124 monitors the execution of the jobs 150 and point-in-time copy operations and updates a job migration database 126 including job performance information 200 and Point-in-Time (PiT) copy information 300. A job migrator 132 maintains job migration information 400 in the job migration database 126 to manage the migration of jobs 150 to the target server 102*b* to execute as jobs 154. The PiT copy information 300 includes information on the occurrence of the creation of PiT copies, such as the occurrence of the execution of FREEZE and GO commands and other initiated Point-in-Time copy operations, such as a Zero Suspend FlashCopy operation to cause PiT copies to be created of target volumes 106*b* on the target storage 104*b*. The job migrator 132 may further generate a job migration graphical user interface (GUI) 160 to enable an administrator to select eligible jobs 150 for migration.

The target server 102*b* further includes a remote job migration manager 140 to manage requests from the source job migrator 132 to migrate a job 150 to the target server 102*b* and implement the migrated job 154 in the target job catalog 120*b* to execute on the target server 102*b*.

The components of the copy manager 112*a*, 112*b* and job migration components 124, 126, and 132 are shown as separate from the operating system 116*a*, 116*b*. In alternative embodiments, these components may be included in the operating system 116*a*, 116*b* components.

The network 108 may comprise a local area network (LAN), storage area network (SAN), wireless network, peer-to-peer network, the Internet, and Intranet, direct connections, bus interface, etc.

The servers 102*a*, 102*b* may comprise a storage server, such as an enterprise storage server, a workstation, mainframe, blade servers, virtual servers, etc. The storages 104*a*, 104*b* may each comprise one or more storage devices, where the storage devices may comprise a solid state storage device comprised of solid state electronics, such as a EEPROM (Electrically Erasable Programmable Read-Only Memory), flash memory, flash disk, storage-class memory (SCM), etc., magnetic storage disk, an array of disks, optical disk, tape, etc. The storages 104*a*, 104*b* may be implemented in a distributed storage environment or network storage environment, such as "cloud" storage. Alternatively, the storages 104*a*, 104*b* may be implemented at a single location.

The copy managers 112*a*, 112*b*, job migrator 132, and listener 124 may be implemented as code in a computer readable storage medium executed by a processor. Alternatively, the copy managers 112*a*, 112*b*, job migrator 132, and listener 124 may be implemented with hardware logic, such as an Application Specific Integrated Circuit (ASIC).

Figure 2:
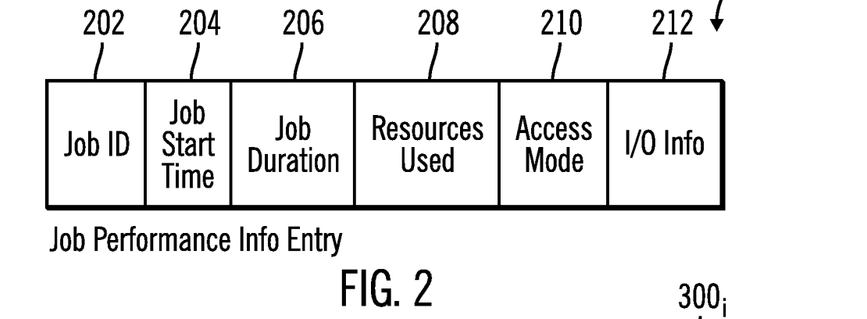
FIG. 2 illustrates an embodiment of job performance information.

FIG. 2 illustrates an embodiment of an instance 200, of the job performance information 200 having job execution characteristics for one of the jobs 150, and may include a job identifier 202; a job start time 204; a job duration 206; resources used 208, such as computational and storage resources; an access mode 210, e.g., sequential, non-sequential, etc.; and Input/Output (I/O) information 212 having information on read and write operations, such as the location accessed, bytes accessed, time of access, etc. The listener 124 may generate the entries 200, by monitoring the execution of jobs 150 and from accessing operating system job measurement data 122*a*, such as SMF and RMF records and other log records generated by the operating system 116*a*.

Figure 3:
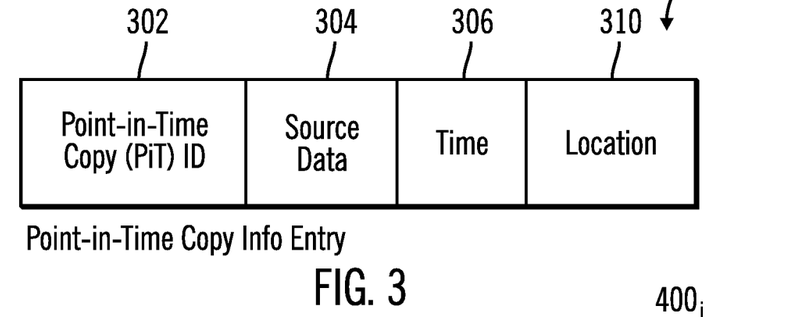
FIG. 3 illustrates an embodiment of Point-in-Time (PiT) copy information.

FIG. 3 illustrates an embodiment of an instance 300, of the PiT copy information 300, including a PiT identifier (ID) 302; source data 304 subject to the PiT copy, which may comprise the mirrored data in the source volumes 106*a*; a PiT time 306 the PiT was created; and a location 308 of the PiT copy in one of the storages 104*a*, 104*b*.

Figure 4:
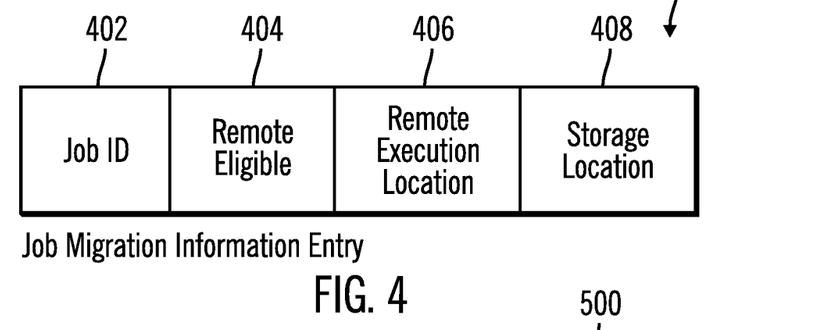
FIG. 4 illustrates an embodiment of job migration information.

FIG. 4 illustrates an embodiment of an instance 400, of the job migration information 400 for one job 150 eligible for migration, including a job ID 402; a remote eligible indicator 404 indicating whether the job 402 is eligible for migration to the target server 102*b* to execute; a remote execution location 304 indicating a remote server 102*b* to which the job 402 was migrated if the job 402 was migrated or indicating the job 402 was not migrated; and a storage location 406 of where the job 402 code is located in the mirrored data.

Figure 5:
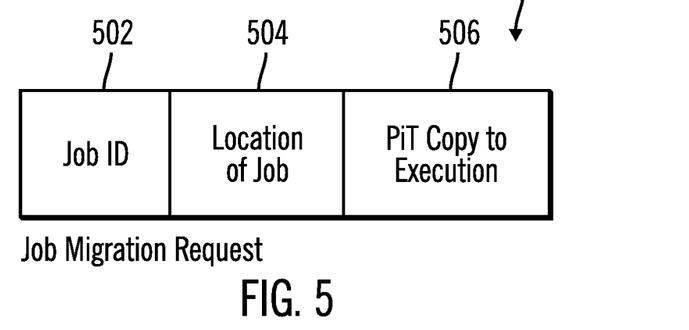
FIG. 5 illustrates an embodiment of a job migration request used to migrate a job from a source server to a target server.

FIG. 5 illustrates an embodiment of a job migration request 500 that the job migrator 132 generates to send a job 150 to the remote job migration manager 140 to implement the execution of the job 150 as job 154 on the target server 102b. The request 500 may include a job ID 502; a location of the job 504 files and data in the mirrored data, a copy of which is in the mirrored target volumes 106b and PiT copies 110; and a PiT copy to execute 506 if the remote job 154 is to execute against a PiT copy 110 instead of the mirrored data in the target volumes 106b. The target server 102b may load the job 154 from the mirrored data target volumes 106b to execute or the job code may be loaded from the PiT copy 110 and executed.

Figure 6A:
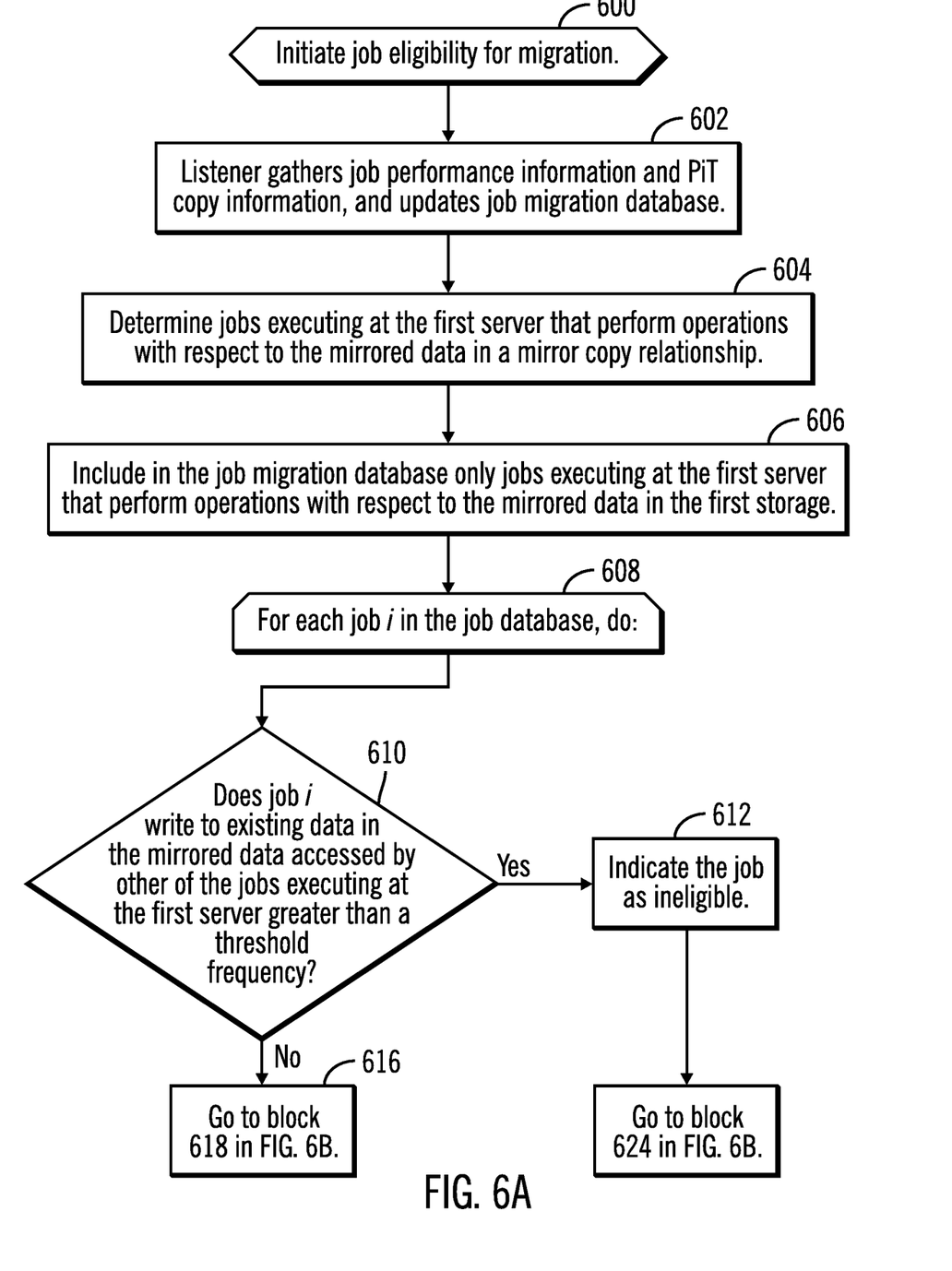
FIGS. 6*a* and 6*b* illustrate an embodiment of operations to determine jobs eligible for migration.
Figure 6B:
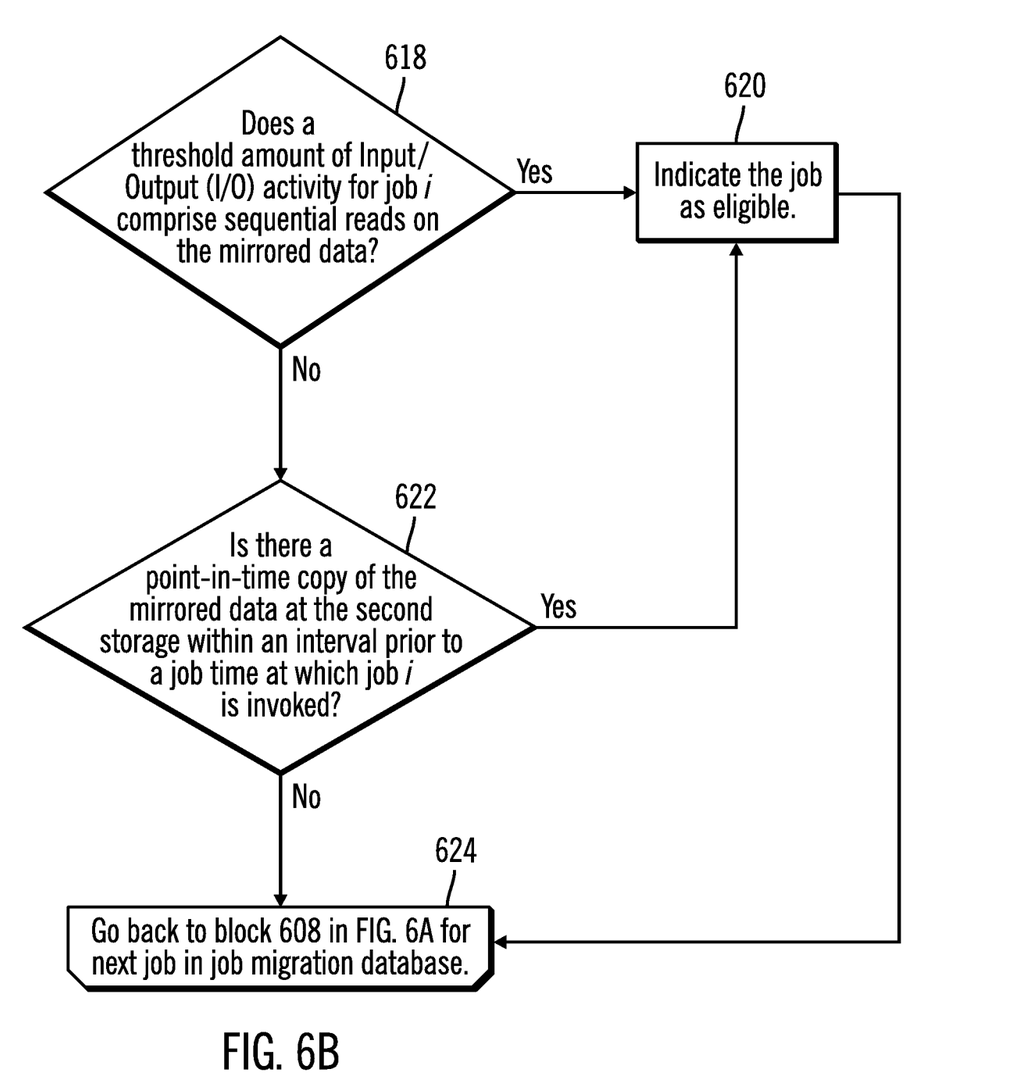

FIGS. 6a and 6b illustrate an embodiment of operations performed by job migration related components such as the job migrator 132, listener 124 and/or operating system 116a components to determine jobs 150 executing in the source server 102a eligible for migration. Upon initiating (at block 600) the job eligibility for migration operation, the listener 124 gathers (at block 602) job performance information 200 and PiT copy information 300 from monitoring jobs 150 including jobs comprising PiT copy operations, and gathering information from the job measurement data 122a, and updates the corresponding information 200 and 300 in the job migration database 126. The job migrator 132 determines (at block 604) jobs 150 executing at the source server 102a that perform operations with respect to the mirrored data in source volumes 106a in a mirror copy relationship with mirrored target volumes 106b. The job migrator 132 may include (at block 606) in the job migration information 400 entries 400, only for jobs 150 executing at the source server 102a that perform operations with respect to the mirrored data in the source storage 104a. In this way, jobs 150 are migrated to the target server 102b that will operate on mirrored data that is also at the target storage 104b coupled to the target server 102b, and not operate on non-mirrored source data remaining at the source storage 104a. This optimizes the migrated job 154 execution by avoiding network 108 transfers to have the job 154 access non-mirrored data not on the target storage 104b.

The job migrator 132 performs a loop (at blocks 608 through 624 in FIG. 6b) to perform the operations at blocks 610 through 622 for each job entry 400, indicated in the job migration information 400. If (at block 610) job i writes to existing data in the mirrored data accessed by other of the jobs executing at the source server greater than a threshold frequency, then the job i is indicated (at block 612) as ineligible, such as by indicating ineligible in the remote eligible 404 field in the entry 400, for job i. The job migrator 132 may determine the write frequency and locations written for job i from the job performance information entry 200, for job i. In this way, a job 150 is not eligible for migration if it is writing frequently to locations in the migrated data written to frequently by other jobs because if the job were migrated it could write inconsistent data to the mirrored data locations at the target storage 104b that are frequently being updated by other processes and jobs 150 on the source server 102a. The threshold frequency may be set by an administrator or have a default value.

If there are not determined frequent writes to mirrored data the source job is accessing, then with respect to FIG. 6b, if (at block 618) a threshold amount of Input/Output (I/O) activity for job i comprise sequential reads on the mirrored data, then the job i is indicated (at block 620) as eligible for migration in the remote eligible field 404. Jobs 150 that perform sequential reads on mirrored data are suitable for migration because their operations may be performed without modifying mirrored data and thus not affect other job 150 operations on the source server 102b. Further, jobs 150 that perform primarily sequential reads are particularly suited for migration because they may operate on a PiT copy or the data without interfering with the mirroring of the source data to the target. Also, if (at block 622) point-in-time copies 110 of the mirrored data at the target storage 104b are created within an interval prior to job times at which job i was executed, then the job is also indicated (at block 620) as eligible in the remote eligible field 404. The job performance information 200 and PiT copy information 300 may be used to determine if there are PiT copies 110 that have occurred at the target server 102b prior to the execution of the job 150 on the source server 102a. Jobs occurring right after a PiT copy of the mirrored data is created are suited for migration because that migrated job 154 may run on the recently created PiT copies 110 without interfering with the mirroring of data to the target volumes 106b. After a job is indicated as eligible or ineligible, then control proceeds back to block 608 to consider another job in the job migration information 400. Other or alternative considerations may be used to determine whether a job 150 is eligible or ineligible for migration, and the above considerations comprise examples.

The default setting of the remote eligible 404 indicator may be set ineligible that is only changed if a determination of eligibility is made. Once a job 150 is indicated as migration eligible, then it may be immediately migrated to the target server 104b to execute or there may be further considerations to select a subset of the migration eligible jobs 150 to migrate.

Figure 7:
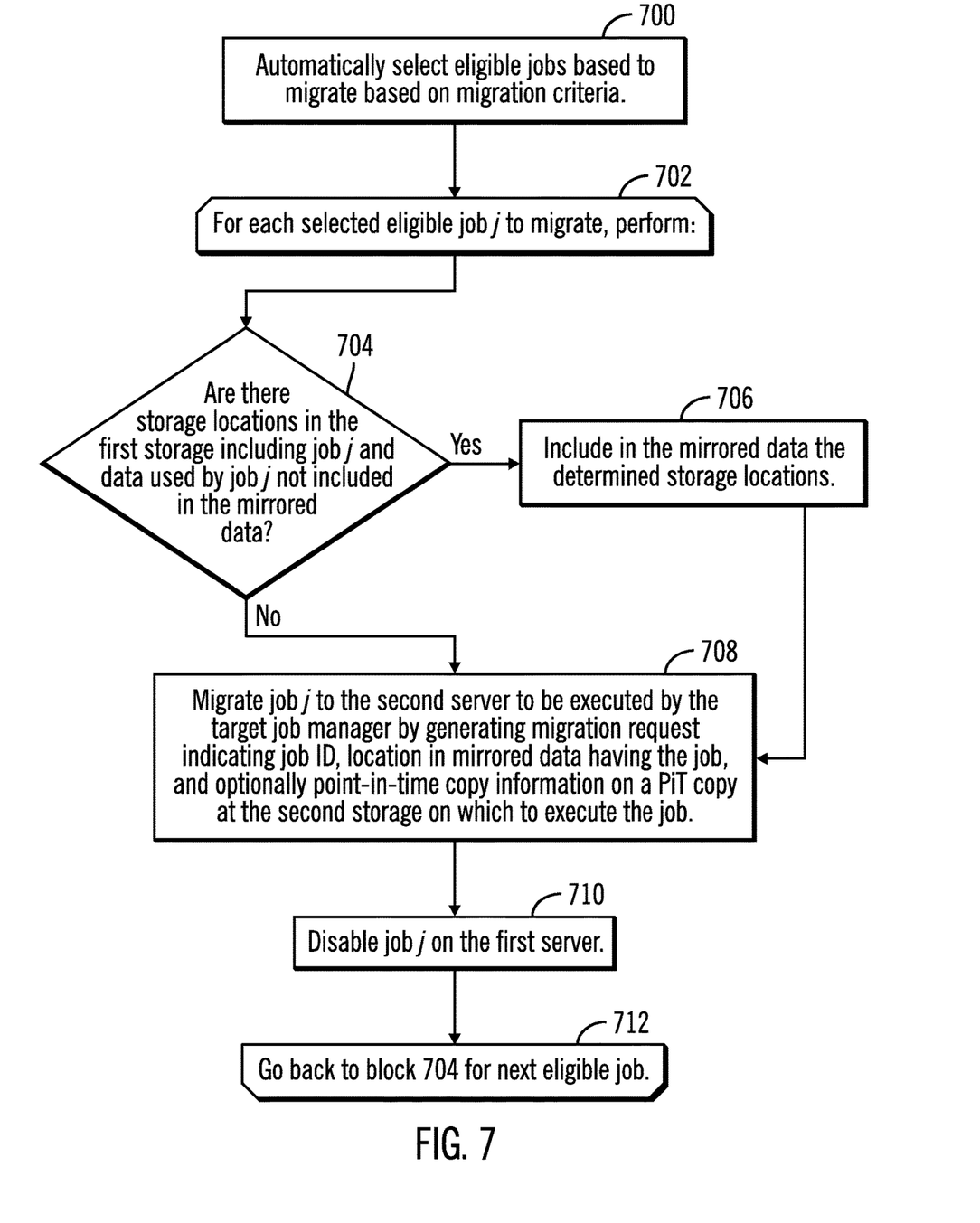
FIG. 7 illustrates an embodiment of operations to automatically select eligible jobs for migration.

FIG. 7 illustrates an embodiment of operations performed by the job migrator 132 to automatically migrate eligible jobs. The job migrator 132 may automatically select (at block 700) eligible jobs (indicated as eligible in the remote eligible field 404) to migrate based on a migration criteria. The migration criteria may be based on resource consumption at the source server 102a, so that jobs 150 are migrated when computational resources at the source server 102a are low in order to release computational resources. The criteria may also be based on the number of jobs 150 executing at the source server 102a, or other factors to determine the stress level at the source server 102a. The job migrator 132 performs a loop (at blocks 702 through 712) of operations 704 through 710 for each selected eligible job j to migrate, or each job whose remote eligible field 404 j indicates the job is eligible. If (at block 704) there are storage locations in the source storage 104a including components of job j and data used by job j not included in the mirrored data, then these determined storage locations are included (at block 706) in the mirrored data.

After the mirrored data is confirmed to have all the components of job j (from the no branch of block 704 or from block 706), the job migrator 132 migrates (at block 708) job j to the target server 102b to be executed by the target job manager 118b by generating migration request 500 indicating the job i ID in field 502, the location in mirrored data having the job in field 504, and optionally point-in-time copy execute information 506 instructing the migrated job 504 to execute on a PiT copy 110 at the target storage 104b. The migrated job 154 may comprise programs loaded from the mirrored data or from the PiT copy 110 on which the migrated job operates. Job j is disabled (at block 710) on the source server 102a, such as by removing the job j from the source job catalog 120a or indicating the job j as disabled.

Figure 8:
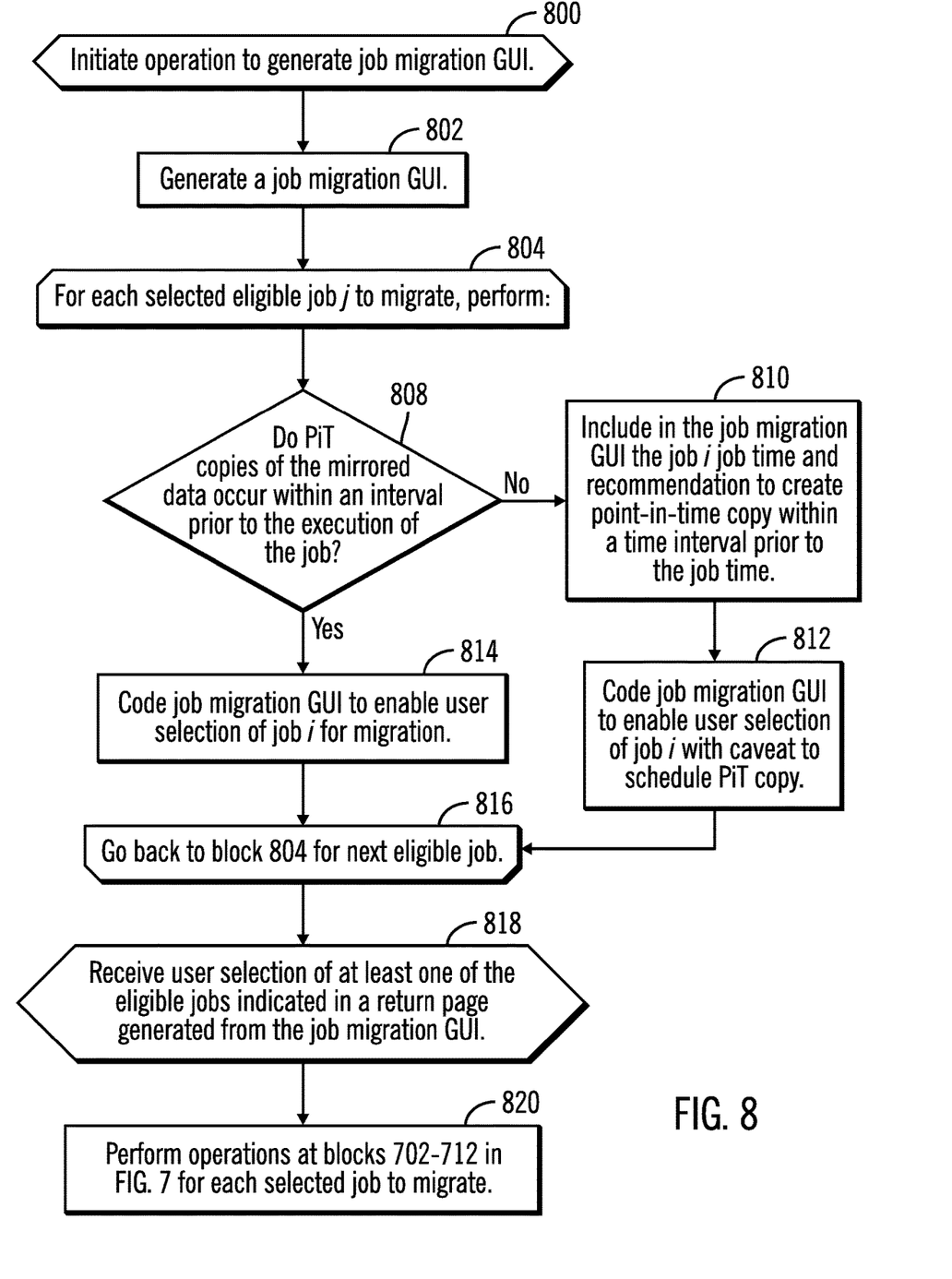
FIG. 8 illustrates an embodiment of operations to generate a graphical user interface (GUI) to enable a user to select eligible jobs to migrate.

FIG. 8 illustrates a further embodiment for selecting eligible jobs to migrate that generates a job migration GUI 160 including GUI controls to enable an administrator to select jobs for migration as input to the job migrator 132 as the jobs selected for migration. Upon initiating (at block 800) an operation to generate a job migration GUI 160, the job migrator 132 generates (at block 802) a job migration GUI 160 (FIG. 1) in a computer renderable form, such as a text file, Hypertext Markup Language (HTML) file, application panel, etc. The job migrator 132 performs a loop (at blocks 804 through 816) of operations 806 through 814 to include information in the job migration GUI 160 for each eligible job 150. At block 806, the job migrator 132 determines whether point-in-time 108 copies of the mirrored data occur at the target storage 104b within an interval prior to the execution of the job 150. This information may be determined from the job performance information 200 having information on when the job 150 has executed and PiT copy information 300 having information on the creation of PiT copies 108. In an alternative embodiment, the job migrator 132 may consider scheduled job execution and PiT copy times, as opposed to basing the decision on historical data in the job migration database 126. If (at block 808) there are no PiT copies 108 taken within an interval of when the job executes, then the job migrator 132 includes (at block 810) in the job migration GUI 160 the job i job time and recommendation to create point-in-time copy within a time interval prior to that job time. The job i time may comprise a time the job has regularly executed in the past or a scheduled time as indicated in the job performance information 200. The job migration GUI 160 provides the administrator with a recommendation to create a PiT copy 110 at the target storage 104b prior to the execution of the migrated job 154 so the migrated job 154 may run off the PiT copy 110 of the mirrored data and will not interfere with job mirroring operations. The job migration GUI 160 is coded (at block 812) to enable user selection of job i to migrate with a caveat to schedule a PiT copy at the expected job i execution time so that the migrated job i may process a PiT copy 110 as opposed to the mirrored data subject to ongoing mirroring operations.

If (from the yes branch of block 808) PiT copies 108 occur prior to the job i, then the job migrator 132 codes (at block 814) the job migration GUI 160 to enable user selection of job i for migration. The job migration GUI 160 may then be transmitted to render at an administrator computer.

Upon receiving (at block 818) user selection of at least one of the eligible jobs indicated in return information generated from the job migration GUI 160, the job migrator 132 performs (at block 820) the operations at blocks 702-712 in FIG. 7 to migrate the user selected eligible jobs.

With the described embodiments, jobs executing at a source server are determined as eligible for migration to a target server to which the source server mirrors data based on execution characteristics of the job with respect to the source data. Jobs may be eligible for migration to the target server when they tend to access data that is mirrored and available at the target storage, when they perform mostly reads and do not modify mirrored data such that data consistency problems may occur when data modified by the migrated job is also modified by other jobs or tasks running on the source sever 102a, and when there are PiT copies 110 taken at the target storage 104a of the mirrored data prior to when the migrated job will execute so that the migrated job will operate on a copy of the mirrored data and not interfere with migrations. Jobs 150 determined to be eligible for migration to a target server 102b may be automatically selected for migration based on a migration criteria at the source server. Alternatively, a job migration GUI may be generated to enable an administrator to select eligible jobs to migrate.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
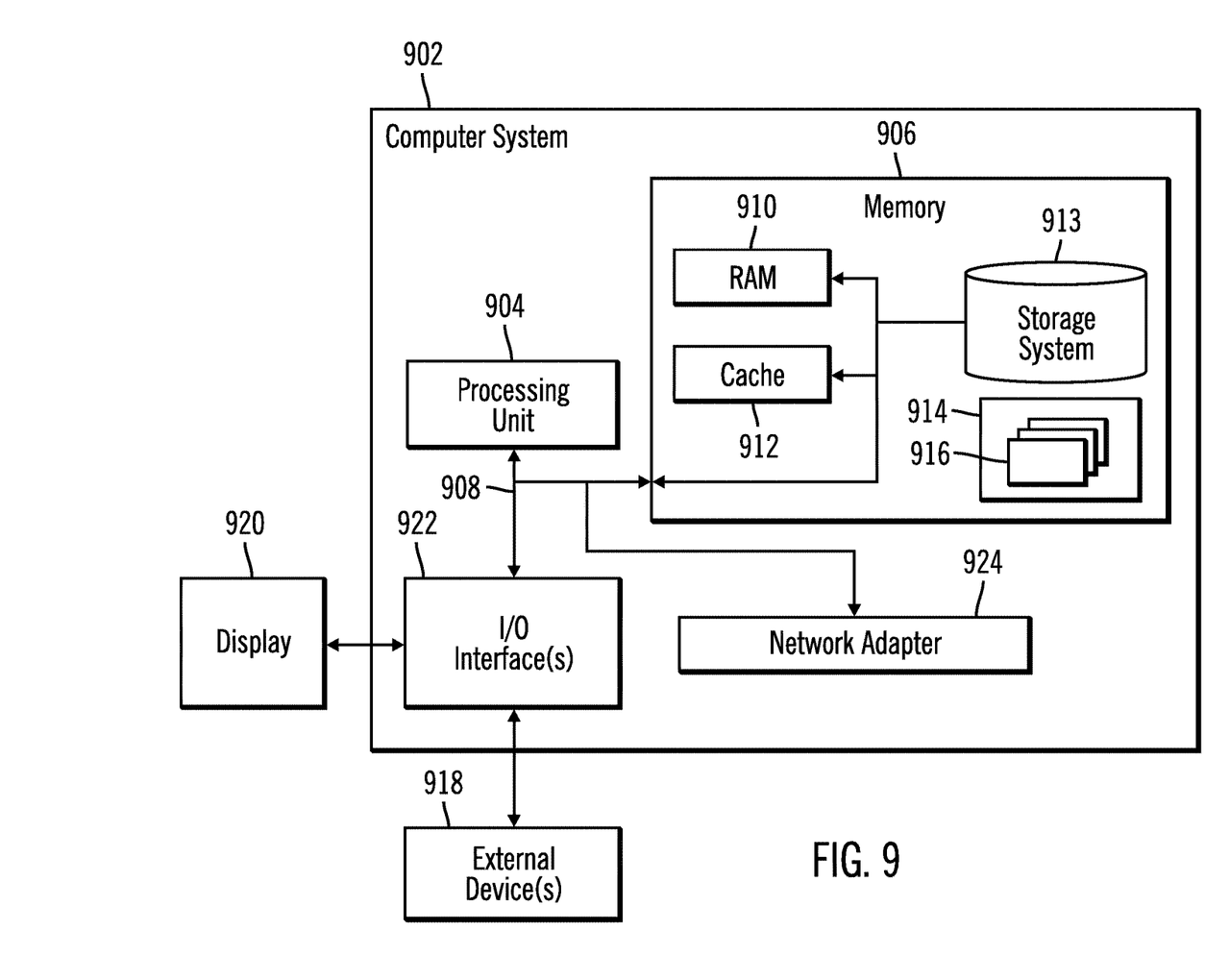
FIG. 9 illustrates an embodiment of a computer system in which embodiments may be implemented.

FIG. 9 illustrates an embodiment of a computer system 902 which may comprise an implementation of the servers 102a and 102b. Alternatively, the servers 102a and 102b may be implemented as a combination of hardware and/or software. The servers 102a, 102b may be implemented in a cloud computing environment in which the they provide storage services to connected hosts. Computer node 902 is only one example of a suitable computing node and is not intended to suggest any limitation as to the scope of use or functionality of embodiments of the invention described herein. Regardless, computer node 902 is capable of being implemented and/or performing any of the functionality set forth hereinabove.

The computer node 902 is operational with numerous other general purpose or special purpose computing system environments or configurations. Examples of well-known computing systems, environments, and/or configurations that may be suitable for use with computer node 902 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 902 may be described in the general context of computer system executable instructions, such as program modules, being executed by a computer system. Generally, program modules may include routines, programs, objects, components, logic, data structures, and so on that perform particular tasks or implement particular abstract data types. Computer node 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 902 is shown in the form of a general-purpose computing device. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 902 typically includes a variety of computer system readable media. Such media may be any available media that is accessible by computer node 902, and it includes both volatile and non-volatile media, removable and non-removable media, and may be used for storing the programs and data used by the programs.

System memory 906 can include computer system readable media in the form of volatile memory, such as random access memory (RAM) 910 and/or cache memory 912. Computer node 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules (e.g., job migrator 132, listener 124, etc., and program data. Each of the operating system, one or more application programs, other program modules, and program data or some combination thereof, may include an implementation of a networking environment. Program modules 916 generally carry out the functions and/or methodologies of embodiments of the invention as described herein, such as the operations of the logging program 8.

Computer node 902 may also communicate with one or more external devices 918 such as a keyboard, a pointing device, a display 920, etc.; one or more devices that enable a user to interact with the computer node 902; and/or any devices (e.g., network card, modem, etc.) that enable computer system/server 902 to communicate with one or more other computing devices. Such communication can occur via Input/Output (I/O) interfaces 922. Still yet, computer node 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The references "i" and "j" are used to indicate a number of an element of a plurality of elements, such as an instance of a job. These references "i" and "j" may comprise different values when used for different or the same element in different series of operations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing execution of jobs in a distributed computing environment having a first server coupled to a first storage and a second server coupled to a second storage, the computer program product comprising a non-transitory computer readable storage medium having computer readable program code embodied therein that executes to perform operations, the operations comprising:
    determining storage locations in the first storage including a job executing at the first server and data at the first storage accessed by the job;
    copying the data at the storage locations in the first storage processed by the job and including the job executing at the first server to a second storage; and
    in response to the copying the data at the storage locations, migrating the job to the second server by generating a migration request identifying the job and a location in the copied storage locations having the job, wherein the migration request implements execution of the job on the second server to perform operations at the second server with respect to the data at the second storage that was copied from the first storage.

2. The computer program product of claim 1, wherein the operations further comprise:
    determining the job to migrate from eligible jobs comprising jobs at the first server that perform operations with respect to mirrored data in a mirror copy relationship copied from the first storage to the second storage.

3. The computer program product of claim 2, wherein the eligible jobs write to the mirrored data at a frequency less than a threshold frequency.

4. The computer program product of claim 2, wherein the eligible jobs have a threshold amount of Input/Output (I/O) activity comprising sequential reads to the mirrored data.

5. The computer program product of claim 2, wherein the eligible jobs have executed within an interval from when a point-in-time copy of the mirrored data was created.

6. The computer program product of claim 2, wherein the operations further comprise:

determining whether any of the storage locations including the job and the data accessed by the job are included in mirrored data in a mirror copy relationship to copy data from the first storage to the second storage; and
including any of the storage locations determined to be not included in the mirrored data in the mirrored data to have the mirrored data include all components of the job to migrate.

7. The computer program product of claim 1, wherein the operations further comprise:
disabling the job at the first server after the job is migrated to execute at the second server.

8. A system for managing execution of jobs in a distributed computing environment including a first storage and a second server coupled to a second storage, comprising:
a first server including a processor coupled to the first storage;
a computer readable storage medium including program code executed by the first server to perform operations, the operations comprising:
determining storage locations in the first storage including a job executing at the first server and data at the first storage accessed by the job;
copying the data at the storage locations in the first storage processed by the job and including the job executing at the first server to a second storage; and
in response to the copying the data at the storage locations, migrating the job to the second server by generating a migration request identifying the job and a location in the copied storage locations having the job, wherein the migration request implements execution of the job on the second server to perform operations at the second server with respect to the data at the second storage that was copied from the first storage.

9. The system of claim 8, wherein the operations further comprise:
determining the job to migrate from eligible jobs comprising jobs at the first server that perform operations with respect to mirrored data in a mirror copy relationship copied from the first storage to the second storage.

10. The system of claim 9, wherein the eligible jobs write to the mirrored data at a frequency less than a threshold frequency.

11. The system of claim 9, wherein the eligible jobs have a threshold amount of Input/Output (I/O) activity comprising sequential reads to the mirrored data.

12. The system of claim 9, wherein the eligible jobs have executed within an interval from when a point-in-time copy of the mirrored data was created.

13. The system of claim 8, wherein the operations further comprise:
determining whether any of the storage locations including the job and the data accessed by the job are included in mirrored data in a mirror copy relationship to copy data from the first storage to the second storage; and
including any of the storage locations determined to be not included in the mirrored data in the mirrored data to have the mirrored data include all components of the job to migrate.

14. The system of claim 8, wherein the operations further comprise:
disabling the job at the first server after the job is migrated to execute at the second server.

15. A method for managing execution of jobs in a distributed computing environment having comprising:
determining storage locations in a first storage including a job executing at a first server and data at the first storage accessed by the job;
copying the data at the storage locations in the first storage processed by the job and including the job executing at the first server to a second storage; and
in response to the copying the data at the storage locations, migrating the job at the storage locations in the first storage to a second server by generating a migration request identifying the job and a location in the copied storage locations having the job, wherein the migration request implements execution of the job on the second server to perform operations at the second server with respect to the data at the second storage that was copied from the first storage.

16. The method of claim 15, further comprising:
determining the job to migrate from eligible jobs comprising jobs at the first server that perform operations with respect to mirrored data in a mirror copy relationship copied from the first storage to the second storage.

17. The method of claim 16, wherein the eligible jobs write to the mirrored data at a frequency less than a threshold frequency.

18. The method of claim 16, wherein the eligible jobs have a threshold amount of Input/Output (I/O) activity comprising sequential reads to the mirrored data.

19. The method of claim 16, wherein the eligible jobs have executed within an interval from when a point-in-time copy of the mirrored data was created.

20. The method of claim 16, further comprising:
determining whether any of the storage locations including the job and the data accessed by the job are included in mirrored data in a mirror copy relationship to copy data from the first storage to the second storage; and
including any of the storage locations determined to be not included in the mirrored data in the mirrored data to have the mirrored data include all components of the job to migrate.

\* \* \* \* \*